Figure 1:
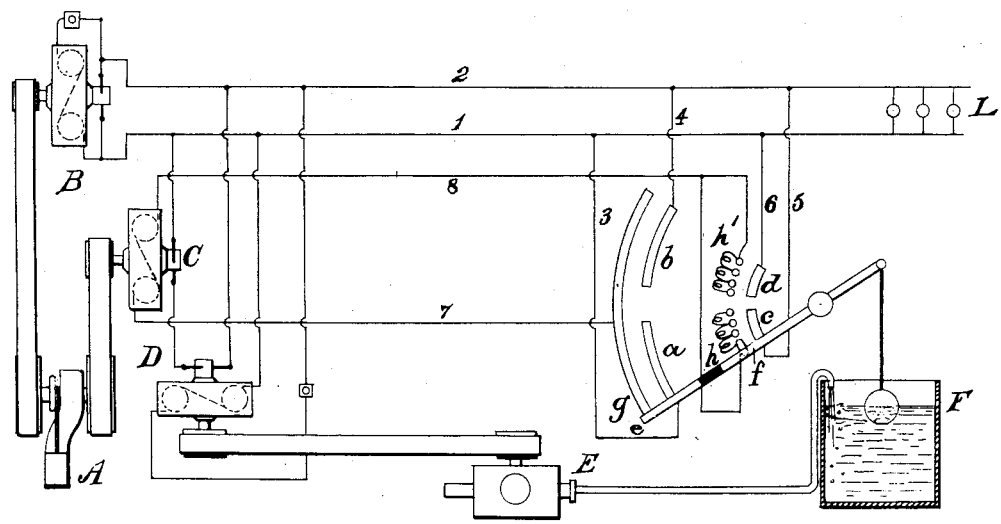

No. 872,298. PATENTED NOV. 26, 1907.
H. W. LEONARD.
MEANS FOR AUTOMATICALLY CONTROLLING ELECTRIC MOTORS.
APPLICATION FILED JAN. 28, 1902. RENEWED JULY 10, 1905.

3 SHEETS—SHEET 1.

No. 872,298. PATENTED NOV. 26, 1907.
H. W. LEONARD.
MEANS FOR AUTOMATICALLY CONTROLLING ELECTRIC MOTORS.
APPLICATION FILED JAN. 28, 1902. RENEWED JULY 10, 1905.
3 SHEETS—SHEET 2.
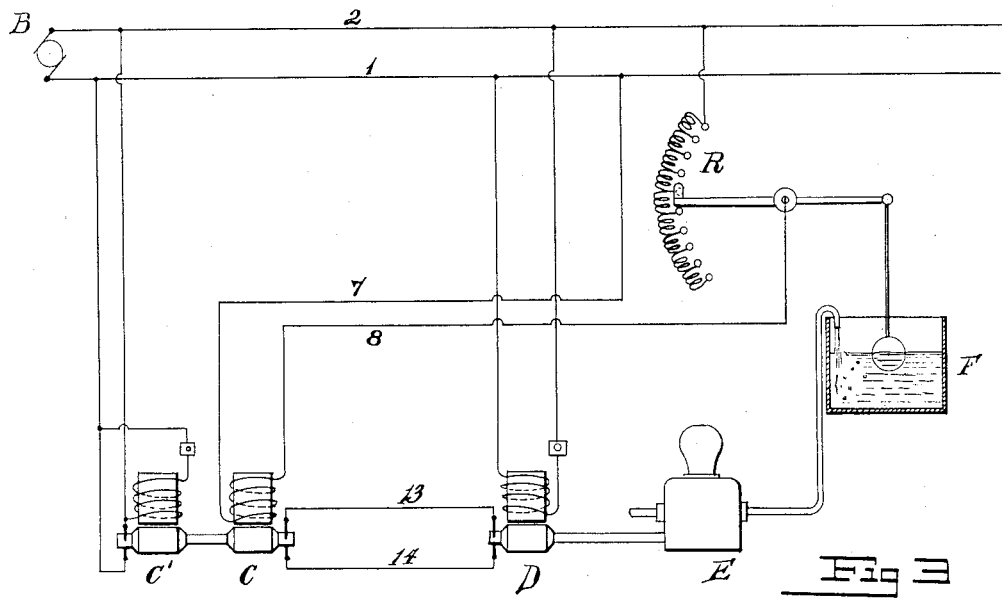
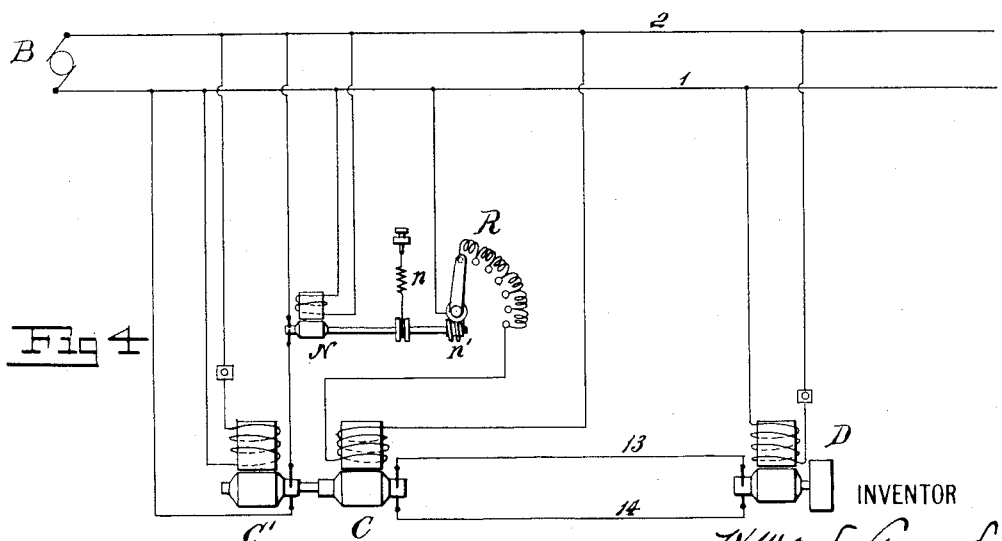
WITNESSES:
Harry G. Walters
Fred'k C. Fischer
INVENTOR
H. Ward Leonard
BY
ATTORNEY No. 872,298. PATENTED NOV. 26, 1907.
H. W. LEONARD.
MEANS FOR AUTOMATICALLY CONTROLLING ELECTRIC MOTORS.
APPLICATION FILED JAN. 28, 1902. RENEWED JULY 10, 1905.

3 SHEETS—SHEET 3.

WITNESSES: INVENTOR
H. Ward Leonard
BY
ATTORNEY

UNITED STATES PATENT OFFICE.

HARRY WARD LEONARD, OF BRONXVILLE, NEW YORK.

MEANS FOR AUTOMATICALLY CONTROLLING ELECTRIC MOTORS.

No. 872,298.   Specification of Letters Patent.   Patented Nov. 26, 1907.

Original application filed February 6, 1897, Serial No. 622,269. Divided and this application filed January 28, 1902, Serial No. 91,577.
Renewed July 10, 1905. Serial No. 269,132.

*To all whom it may concern:*

Be it known that I, HARRY WARD LEONARD, a citizen of the United States, residing at Bronxville, in the county of Westchester and State of New York, have invented a certain new and useful Improvement in Means for Automatically Controlling Electric Motors, of which the following is a specification.

My invention relates to the control of electric motors and especially to the automatic control of electric motors in such a way that the motor will automatically operate to do just the amount of work required of it when the amount of work to be done is variable as in the case of pumping water compressing air, &c.

It is frequently important that a pump be operated so as to maintain a certain level of water as in the draining of mines. The amount of water flowing into the mine is of course variable and beyond control. By my invention an electric motor operating a pump will automatically pump at just the speed required to maintain the level of the water constant regardless of the rate of inflow.

In a water supply system it is important that the pumping machinery shall maintain a constant pressure on the mains and in the use of compressed air, it is desirable that the air shall be maintained at a constant pressure independent of the demand. By my invention this is automatically accomplished in a very simple manner.

In the operation of certain machinery, it is desirable that means be provided which will automatically protect the same from being exposed to excessive strains. This can be readily accomplished by the use of my invention.

My invention is also applicable to the operation from a source of power having a tolerably constant amount of energy at a tolerably constant speed, of machinery the torque element of the power of which may vary very widely, such as hoists, pumps, locomotives, etc.

With my invention I may use a prime motor not very steady as to speed and secure constant speed at final motor by driving a centrifugal governor by the final motor which governor will be the automatic regulator.

In carrying my invention into effect I sometimes employ any well known form of automatic device, such as a float, a centrifugal governor, a diaphragm or plunger operated by air, gas or water etc., to adjust a rheostat connected in the field circuit of a dynamo-electric machine, which supplies a part or all of the energy for the working motor to be controlled, that is to say, instead of regulating the working motor directly, I regulate its source of energy. In other words, I automatically cause to be varied the net effective volts delivered to the working motor to such a voltage as will operate the motor at the speed required.

Figure 2:
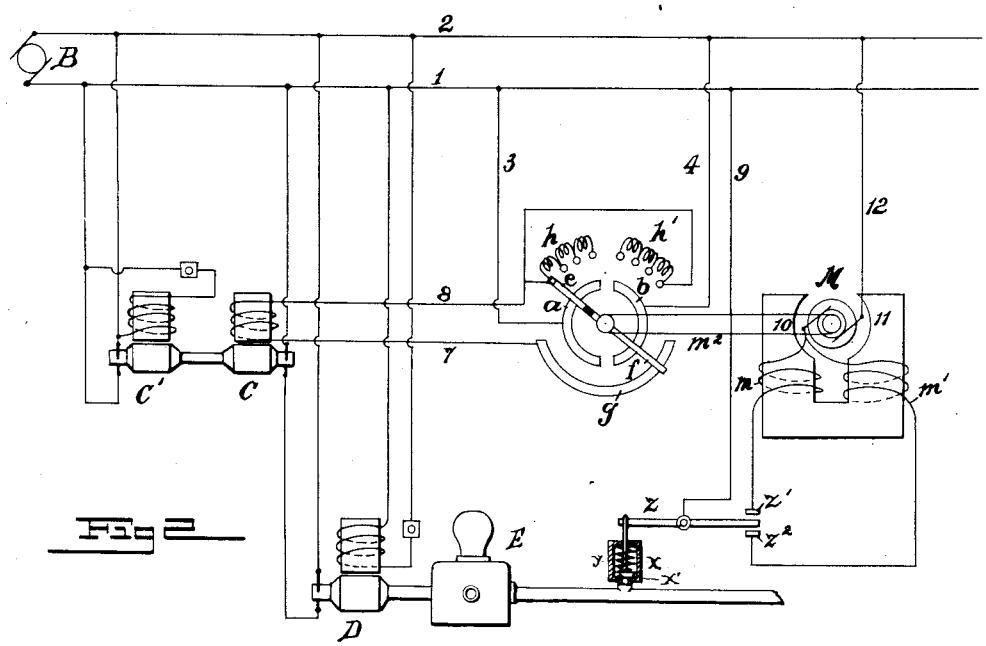
Figure 5:
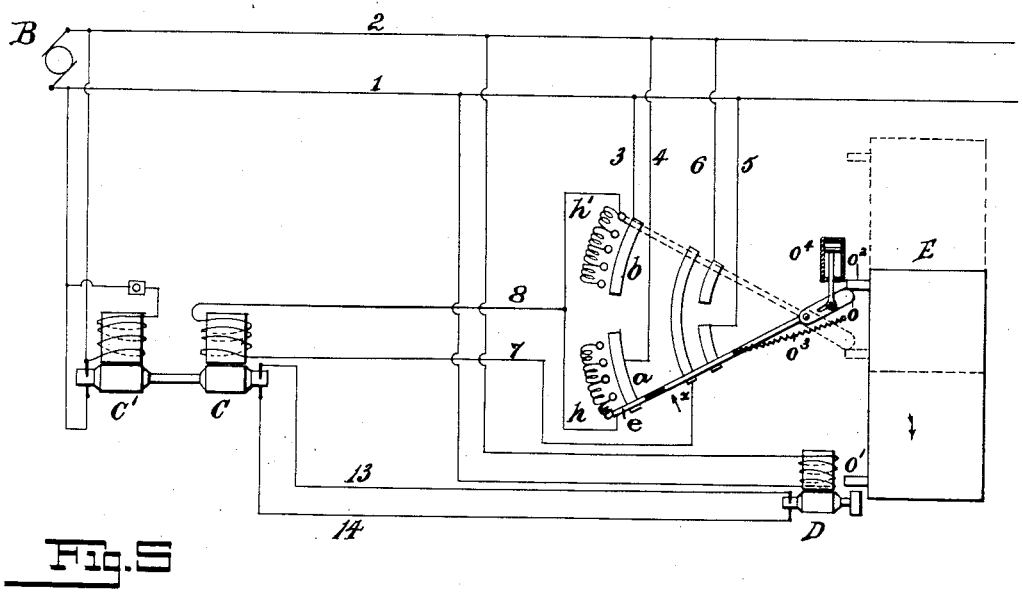
Figure 6:
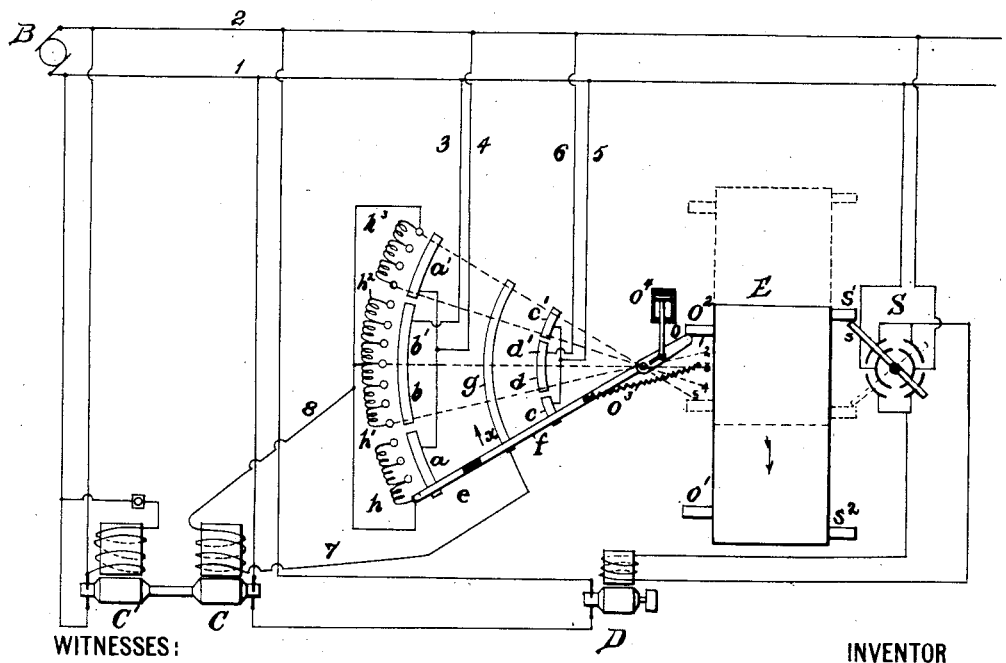

Certain forms of my invention are illustrated in the accompanying drawings in which Figure 1 is a diagrammatic view illustrating my invention applied to a pumping system; Fig. 2 a similar view of a modified arrangement of my invention applied to an air compressor system; Fig. 3 a similar view of another modification of my arrangement applied to a pumping system; Fig. 4 a diagrammatic view illustrating another specific form of controlling devices; and Figs. 5 and 6 illustrate the arrangements of Figs. 3 and 2 respectively applied to a piece of machinery in which the part operated upon is given a reciprocating motion.

Referring to Fig. 1 of the drawings in which my invention is applied to a pumping system operating in conjunction with an isolated electric lighting plant, A indicates a steam engine or other prime mover driving dynamo-electric machines B and C. Conductors 1 and 2 extend from the machine B, between which are connected incandescent electric lamps L. The armature of the dynamo C is connected across the circuit 1—2 in series with the armature of a working motor D. The dynamo C has a separately excited, variable, and reversible field connected across the circuit 1—2 through an automatic reversing rheostat, the details of which will be hereinafter referred to. The field circuit of the working motor D is a practically constant one connected across the circuit 1—2. Thus it will be seen that by connecting the armature of the working motor across the circuit 1—2 in series with a dynamo whose field is variable and reversible, the working motor may be operated at any speed from zero to a speed due to the sum of the E. M. F.'s of machines B and C, the E. M. F.'s of said machines being practically equal. That is to say, if the machines B and C are both 100-volt machines and both are producing their maximum electromotive force, and if the electro-motive force of machine C is counter to that of machine B, the working motor will receive no energy and will remain at rest. Now if the field of C be weakened, thus reducing the electromotive force produced by that machine, the working motor will receive energy due to the difference between the electromotive forces of B and C. The energy so delivered to the working motor may be increased by decreasing the strength of the field of machine C until that machine is producing practically no electromotive force, and then by reversing the field of that machine, it will generate an electro-motive force in the same direction as that of machine B, and the working motor will receive an electro-motive force equal to the sum of the electromotive forces of machines B and C, and this electromotive force can be further increased by increasing the strength of the field of machine C, thus increasing the electromotive force produced thereby, and increasing the speed of the working motor, until the working motor receives the full electromotive force of the machines B and C. The working motor drives a pump E whose outlet leads to a reservoir F, the water in which must be maintained at a certain level. A float in the reservoir may be employed to automatically control the reversing rheostat for the dynamo C, which rheostat may be of any desirable form. As shown, it comprises contact-plates $a$ and $b$, from which extend conductors 3 and 4, respectively, to the conductors 1, 2; contact-plates $c$ and $d$ also connected with conductors 1, 2 by wires 5 and 6 respectively; a pivoted contact-arm connected with the float and having two conducting surfaces $e$ and $f$ insulated from each other; a contact-plate $g$ and resistances $h$ and $h'$ connected with the conductors 7 and 8 respectively, which extend from the field-magnet coils of machine C. The position of the float and the automatic rheostat shown is one when the water in the reservoir is at the maximum level, that is, the entire resistance $h$ is out of the field circuit of machine C, which machine then has a strong field and is generating its maximum E. M. F., and assuming that this E. M. F. is equal and opposite to that of machine B, the working motor will receive no energy. When the water in the reservoir falls below the maximum level, the float descends and moves the contact-plates $e$ and $f$ upward, inserting a resistance in the field circuit of the machine C, thus weakening the field of that machine and gradually reducing its E. M. F., and hence the armature of the working motor will receive an amount of energy from the main line 1—2 due to the difference between the electromotive forces produced by the machines B and C. If the float continues to descend, the contact-arms $e$ and $f$ will continue to rise, inserting more resistance in the field circuit of machine C and hence increasing the energy delivered to the working motor. If the water in the reservoir falls low enough to cause the float to carry the contacts $e$ and $f$ beyond the horizontal line, so that the plate $e$ will bridge the plates $g$ and $b$, and the plate $f$ will bridge the resistance $h'$ and plate $d$, the field circuit of the machine C will be reversed, but with a weak field, so that a small E. M. F. will be generated by machine C in the same direction as that from the machine B; thus the armature of the working motor will receive an amount of energy due to the sum of the electromotive forces of the machines B and C and which amount of energy can be increased by strengthening the field of machine C. Thus it will be seen that the speed of the motor D may be gradually and automatically increased according to the fall of the water in the reservoir, and when the water in the reservoir begins to rise, the reverse action will take place and continue until the water reaches the maximum level, when the automatic rheostat will be again in its limiting position and the working motor will receive no energy. It will also be seen that the position of the controlling means will adjust itself to cause the motor to operate at a speed corresponding with the demand upon it; for example, if the water is drawn from the tank at a certain rate, then the controlling means will be automatically adjusted to cause the motor to operate at a practically fixed speed corresponding to the required rate of flow of the water. It will also be noted that machine C acts as a motor when its electromotive force opposes and is less than that of the supply and act as a generator when its electro-motive force acts with that of the supply.

In Fig. 2 the dynamo C is driven by a motor C' instead of by the prime mover as in Fig. 1. The motor C' may be a shunt wound motor connected across the circuit 1—2. The relative arrangement of the machines C and D is the same as in Fig. 1, but the automatic regulator is somewhat different, as will be presently pointed out. The apparatus E in this figure may be a pump for a water system in which a certain pressure must be maintained, or it may be an air compressor or any similar apparatus. The outlet pipe from E communicates with a chamber $x$ within which may be a diaphragm, a plunger or similar device $x'$ against which is seated a spring $y$, the tension of which is regulated to counterbalance a certain pressure in the outlet pipe from the apparatus E. The plunger or similar device $x'$ is connected with a pivoted circuit controller $z$, which plays between two contacts $z'$ and $z^2$. When the spring $y$ and the pressure in the outlet pipe counterbalance each other, the contact $z$ will assume a normal position between the two contacts $z'$ and $z^2$ but not in contact therewith. The pivoted contact $z$ is connected with the main conductor 1 by a conductor 9, the contact $z'$ is connected with the field coil $m$ of a small motor M, and the contact $z^2$ is connected with the field coil $m'$ of the motor M, and both the field coils $m$ and $m'$ are connected with the brush 10 of the motor, and the brush 11 is connected by wire 12 to the main conductor 2. The field coils $m$ and $m'$ are wound so as to produce a field magnetism in opposite directions according to which of the coils are connected in circuit. The object of this arrangement is to cause the armature of the motor M to run in opposite directions, according to the rise and fall of the pressure in the outlet pipe from the apparatus E; that is to say, if the pressure becomes too great, the piston $x'$ will be raised and the lever $z$ will make contact with the plate $z^2$, placing the field coil $m'$ in circuit, whereas if the pressure falls below a certain point, the spring $y$ will overbalance the pressure in the outlet pipe and force the piston $x'$ downward, causing the lever $z$ to make contact with the contact-plate $z'$ and place the field coil $m$ in circuit. This reversal of the connections reverses the field magnetism of the motor M, and hence reverses the direction of rotation of its armature. The motor M is a very small one and is employed solely to operate the field regulating and reversing switch for the dynamo C. In this switch, which is practically the same as that of Fig. 1, the plate $g$ is connected by wire 7 with the field coils, and the resistances $h$ and $h'$ are connected with the field coil of the machine C by the wire 8. The contact-plates $a$ and $b$ are connected with the conductors 1, 2 by wires 3 and 4 respectively. The position of the switch, as indicated in the drawing, is similar to that of Fig. 1, and upon a decrease in the pressure in the outlet pipe, the pivoted contact $z$ will make contact with the plate $z'$, which will start the motor M in operation and move the contact-arms $e$ and $f$ toward the right and left respectively, increasing the resistance in the field circuit of the machine C, with the results above indicated. It will therefore be understood from this construction that any decrease in pressure below that desired will cause the motor M to change the position of the field rheostat of the machine C so as to increase the speed of motor D to a rate practically corresponding with the demand upon the pressure supply. The armature of the motor M may be connected by any suitable means with the contact-arms $e$ and $f$, a belt $m^2$ being shown for this purpose.

In Fig. 3 which shows another modification of my invention, the dynamo C is driven by a motor C', as in Fig. 2, but the armatures of the machine C and working motor D are in a local circuit 13—14. By this arrangement the armature of the working motor receives energy only from the machine C. The field coils of the machine C are connected by wires 7, 8, across the main circuit 1—2 through a simple rheostat R controlled automatically by a float in a reservoir F, as in Fig. 1. The contact lever of the rheostat is at an intermediate position and the motor D is operating at an intermediate speed.

In Fig. 4 which shows another modification of my invention, 1—2 is the main line, and B the generator, as before, and C is the dynamo driven by motor C', as in Fig. 2. The armatures of the machine C and working motor D are connected in a local circuit 13—14, as in Fig. 3, although the armatures of these two machines may be connected in series across the main line 1—2, as in Figs. 1 and 2. The field of the machine C is regulated by a rheostat operated by a very small machine N, whose armature is of low voltage and whose field is wound to be connected across the circuit 1—2. The current for the armature of machine C' passes through the armature of machine N, producing a torque balanced by a spring or other suitable device $n$. The shaft of the armature of motor N is provided with a worm $n'$, which meshes with a worm-wheel on the spindle of the contact-lever of the rheostat R, whereby the rheostat is adjusted by the torque of the armature of N. If the current to machine C' becomes too large, the torque of machine N causes its shaft to revolve and lowers the volts of the energy in the working motor circuit by adjusting the rheostat R in the field circuit of machine C. When the current to machine C' falls, the spring connected with the armature shaft of N causes the shaft to rotate in the opposite direction, thereby readjusting the rheostat to raise the volts of the working motor circuit. This arrangement is useful with a working motor whose torque varies and where it is desirable to always take approximately the same amount of energy. With this arrangement applied to a vehicle, for instance, the vehicle will travel fast on a level and slow on grades while using the same energy.

Fig. 5 shows the application of my invention to the operation of tools or machinery, the connections being the same as in Fig. 3, except that a reversing rheostat is employed. In this illustration the working motor D is designed to operate the table E of a planing machine, and in order to produce the reciprocating movement of the table, the direction of rotation of the motor armature is reversed by automatically reversing the field magnetism of the machine C. This I accomplish by providing for the field circuit of the motor a reversing rheostat like that shown in Fig. 1. The pivoted contact lever of the rheostat is actuated by the engagement of the end $o$ of the lever with lugs $o'$ $o^2$ projecting from the table E. The rheostat lever is provided with a spring $o^3$ which, when the lever is moved over the dead center by the movement of the table, throws the lever to the opposite position. The illustration indicates the table as moving in the direction of the arrow and the lug $o^2$ just engaging the end $o$ of the rheostat lever. This engagement takes place when the table has very nearly reached the end of its movement in one direction. As the table continues to move in the direction of the arrow, the contact lever is moved in the direction of the arrow $x$, and when it is carried over the central position the spring $o^3$ throws the lever to the dotted position. The field magnetism of the machine C being now reversed, the direction of rotation of the motor armature will reverse and the table E will move in the opposite direction. When the table reaches the dotted position the lug $o'$ will engage the lever $o$ and start the lever in the opposite direction, as will be well understood. Thus the direction of rotation of the motor armature is automatically and periodically reversed to produce a reciprocating motion. I have shown a dash-pot $o^4$ for retarding the movement of the rheostat lever when thrown by the spring so that the time required for fully reversing the switch can be varied if desired.

Fig. 6 illustrates the application of the system of Figs. 1 and 2 to the operation of tools or apparatus in which the driven part is moved alternately in opposite directions at desired speeds. As in Fig. 2 the regulating machine C is driven by motor C', and the working motor D and machine C are connected in series across the line 1—2, so that motor D can be driven at speeds varying from zero to a full speed due to the sum of the electromotive forces of the machines B and C. In this arrangement the controlling rheostat for machine C is shown as a double reversing rheostat, that is to say the field connections of machine C are reversed twice in each operation from zero speed to high speed. For this purpose the form of rheostat shown in Fig. 5 is provided with an extra set of contact plates $a'$ $b'$ and $c'$ $d'$, and as preferred and as shown in Fig. 6 contact plates $b$ $b'$ and $d$ $d'$ are made in one section. Similarly the resistance is double—section $h'$ being increased by adding a section $h^2$ of equal resistance and section $h$ being duplicated by a section $h^3$ having the same resistance as section $h$. The circuit connections are as follows; contact plates $a$ and $a'$ are connected together and by wire 4 are connected to main conductor 2; plate $b$ $b'$ is connected by wire 3 to main conductor 1; contact plates $c$ and $c'$ are connected together and by wire 5 are connected to main conductor 1; plate $d$ $d'$ is connected by wire 6 to main conductor 2; the field winding of machine C is connected by wire 7 to contact plate $g$ and by wire 8 to the resistance terminals of sections $h$ and $h^3$ and to the central contact of resistance section $h'$ $h^2$. In the arrangement of Fig. 6, I also provide a reversing switch S for the field winding of working motor D.

In the illustration the working motor D is driving the part E at full speed in the direction of the arrow; that is, there is no resistance in the field circuit of machine C, and the electromotive force of that machine assists the electromotive force of machine B in driving the working motor. In the practical operation of machinery by this method, I prefer to so arrange C that its electromotive force will be slightly less than that of the source, so that the line electromotive force cannot be balanced thereby and the machinery brought to rest by the operation of the automatic controlling mechanism. The movable part E in the illustration is just engaging the end $o$ of the controlling lever $f$, and the continued movement of E moves lever $f$ in the direction of arrow $x$, which effects a gradual weakening of the field of machine C by inserting resistance $h$ while maintaining the line connections, until that machine produces practically no electromotive force, and the speed of motor D will be that due to the line electromotive force only. When lever $f$ reaches the dotted line position 2, the field connections of machine C are reversed with all the resistance of section $h'$ in circuit, and that machine will now produce a low electro-motive force counter to that of the line, and the speed of motor D will be further reduced. When lever $f$ reaches the dotted line position 3 it will be on the central contact of resistance $h'$ $h^2$ which contact is connected with conductor 8 and hence all resistance will again be cut out of the field circuit of machine C and that machine will then produce its full electromotive force counter to that of the line, and the net electromotive force upon the terminals of motor D will be just about sufficient to carry E a slight distance forward to move lever $f$ over the dead center whereupon spring $o^3$ will continue the movement of lever $f$ in the direction of the arrow, but this movement is retarded by the dash-pot $o^4$. Simultaneous with the movement of lever $f$ from position 1 to position 3 stud $s'$ moves lever $s$ of reversing switch S, and when lever $f$ is moved beyond position 3, lever $s$ is simultaneously moved over its center line thus reversing the line connections of the field of motor D. It will be noted that the reversal of the field of motor D takes place when the electro-motive force upon its armature terminals is very low, due to the fact that while lever $f$ is in position 3, machine C is producing its full electro-motive force in opposition to that of the line. The reversal of switch S will cause the armature of D to rotate in the opposite direction, and as the lever $f$ moves toward position 5 the armature will gradually run up to full speed. The movement of lever $f$ beyond position 3 gradually weakens the field of C by inserting resistance section $h^2$ and when that section is all in, machine C will produce practically no electromotive force counter to that of the line. At position 4 the field connections of machine C are reversed with all of resistance section $h^3$ in circuit, and machine C will now produce a low electromotive force in the same direction as that of the line, and when position 5 is reached machine C will produce its full electromotive force in the same direction as the line electromotive force, and the field magnetism of D being reversed, E will move at full speed toward the dotted line position. When lever $f$ is in the dotted line position 5 and switch lever $s$ in its dotted line position, studs $o'$ and $s^2$ will strike their respective levers when table E reaches the dotted line position and the operation described will be repeated and E caused to again move in the direction of the arrow.

It will be understood that the field strength of the motors C' and D may be adjusted to any desired constant value by means of the rheostat in the field winding indicated on the different figures of the drawings.

I do not claim herein the method of controlling electric motors as described herein, since that feature of my invention is embodied in my application Serial No. 622,269, filed February 6, 1897, of which the present application is a division.

While I have shown a form of working motor in which the field element is separately excited, the elemental windings of the motors might in some instances be otherwise connected or arranged.

While I have shown dynamo-electric machines as the form of devices for deriving from the original source of energy the controlling or regulating electromotive force, my invention is not limited in this way as I may employ any suitable form of devices for deriving by magnetic induction the controlling electromotive force from the original source of energy.

It will be understood that my invention may be embodied in various forms of constructions and that I am limited in the scope thereof only as indicated by the following claims.

What I claim is:

1. The combination with a main source of electric energy, of a motor connected therewith, a second source of electric energy between the main source and the motor, and a regulator controlled by the work for automatically varying independently of the motor the electro-motive force of said second source to automatically increase or decrease the speed of the motor to meet the requirements of a variable duty.

2. The combination with a main source of electric energy, of a motor connected therewith, a second source of electric energy between the main source and the motor, and means controlled by the work for automatically varying and reversing the electro-motive force of said second source independently of the motor to automatically control the speed of the motor.

3. The combination of an electric motor, a source of electro-motive force in series with the armature of the motor and a regulator controlled by the work for automatically controlling the electro-motive force of said source to automatically increase or decrease the speed of the motor to meet the requirements of a variable duty.

4. The combination of an electric motor, a device which under conditions of practice must be operated at variable speed, a source of electro-motive force in series with one element of the motor, and a regulator controlled by the work for automatically controlling the electro-motive force supplied to automatically operate the motor at the increased or decreased speeds required by said device.

5. The combination of a translating device requiring in practice a variable electro-motive force upon its terminals, a source of electro-motive force in series with the translating device, and a regulator controlled by the work for automatically controlling the electro-motive force supplied from said source whereby the electro-motive force upon the translating device is automatically increased or decreased as required.

6. The combination of an electric motor, an electro-motive force producing device in series with one element of the motor and a regulator controlled by the work for automatically controlling the electro-motive force produced by the said electro-motive force producing device whereby the speed of the electric motor is automatically increased or decreased to meet the requirements of a variable duty.

7. Two electro-motive force supplying windings mechanically independent of each other and electrically connected together and a regulator controlled by the work for automatically varying the electro-motive force supplied from one of the windings in order to automatically increase or decrease the electro-motive force upon the other winding.

8. An electric motor having a field winding energized by a current other than the current passing through the armature circuit and whose speed must be varied in order to adapt it to the work it performs, and a regulator controlled by the work for automatically increasing or decreasing the electromotive force upon the motor armature as required in order that the motor speed shall be increased or decreased as required by the conditions of the work it performs in practice.

9. The combination of an electric motor having a field winding energized by a current other than the current passing through the armature circuit, a device driven thereby, and means for automatically maintaining any desired fixed speed of said motor, the said speed corresponding approximately to the rate required by the work to be performed.

10. The combination of an electric motor having a field winding energized by a current other than the current passing through the armature circuit, a device driven thereby, and means for automatically maintaining any desired fixed speeds of said motor, the said speeds approximately corresponding to the rates required by the work to be performed and varying approximately in proportion therewith.

11. The combination of an electric motor, a source of electromotive force in series with one element of said motor, and means for automatically regulating the electromotive force of said source so as to correspond approximately with the rate required by the work to be performed.

12. The combination of an electric motor having a field winding energized by a current other than the current passing through the armature circuit, a device driven thereby, and means for automatically controlling the speed of the motor for causing the power of said motor to vary in approximate proportion to the rate at which the work must be performed in accordance with the conditions of practice.

13. The combination of an electric motor having a field winding energized by a current other than the current passing through the armature circuit, a machine driven thereby which must be operated at different speeds in order to maintain certain desired conditions as to the work performed thereby, and means automatically responsive to a change from the desired condition of the work for automatically changing the speed of the motor as required, whereby the desired condition of the work will be maintained.

14. The combination of an electric motor, a device driven thereby, and means for automatically producing a plurality of different fixed speeds of said motor while keeping the resistance in series with the motor armature constant, whereby the said motor operates as required by a variable duty.

15. The combination of an electric motor, a device driven thereby, and means for automatically varying the speed of said motor while keeping the resistance in series with the armature constant, whereby the motor automatically performs work to suit the requirements of a variable duty.

16. The combination of an electric motor having a field winding energized by a current other than the current passing through the armature circuit, a device driven thereby, and means for automatically producing any required speed variation of said motor while keeping the resistance in series with the motor armature constant, whereby the work is automatically performed as required.

17. The combination of a source of electromotive force, an electric motor having a field winding energized by a current other than the current passing through the armature circuit, a device driven thereby, and means for automatically maintaining upon the motor armature a suitable constant electromotive force while conditions are constant, and for automatically maintaining upon the motor armature a suitable different electromotive force when conditions change, whereby the motor automatically performs work at the rate desired.

18. The combination of a source of constant electromotive force, an electric motor having a field winding energized by a current other than the current through the armature circuit, a device driven thereby, and means for automatically maintaining upon the motor armature a suitable constant electromotive force while conditions are constant, and for automatically maintaining upon the motor armature a suitable different electromotive force when conditions change, the said electromotive forces being variable approximately in proportion to the desired rate at which the work is to be performed.

19. The combination of an electric motor, a dynamo electric machine having its armature connected in series with the armature of said motor, and means dependent upon the work to be performed for automatically reversing the electromotive force of said dynamo electric machine.

20. The combination with an electric motor, a dynamo electric machine having its armature connected in series with the armature of said motor, and means dependent upon the work to be performed for automatically increasing and decreasing the electromotive force applied to the armature of said motor by reversing the electromotive force of said dynamo electric machine.

21. The combination of a source of constant electromotive force, a source of variable electromotive force, an electric motor, the said sources and motor being connected in series, and means dependent upon the work to be performed for automatically varying the electromotive force produced by said variable source.

22. The combination of a dynamo electric machine, a motor in circuit therewith, a rheostat in the field circuit of said dynamo electric machine, an electric motor having a reversible armature for operating said rheostat, and automatic means dependent upon the mechanical work to be performed for controlling the action of said motor for operating the rheostat.

23. The combination of a dynamo electric machine, and automatic means responsive to the condition of the mechanical work to be performed for varying the electromotive force of said dynamo electric machine, said means comprising a rheostat and a reversible motor for controlling said rheostat.

24. The combination of a dynamo electric machine having a separately excited field winding, a rheostat in the field circuit thereof, a reversible motor for controlling said rheostat, and automatic means for controlling the operation of said reversible motor.

25. The combination of a source of constant electromotive force, a variable and reversible source of electromotive force, an electric motor in circuit therewith, and automatic means dependent upon the work to be performed for varying and reversing the electromotive force of said second source.

26. In combination with a source of electrical energy, a circuit supplied therefrom, a dynamo suitably actuated and included in circuit, and a field magnet controlling device for the said dynamo governing the direction of the electromotive force produced by said dynamo, and electromagnetic means supplied from said circuit for actuating the said controlling device.

27. In combination with a source of electrical energy, a circuit supplied therefrom, a dynamo suitably actuated and included in circuit, and an automatic field magnet controlling device for the said dynamo governing both the direction and the amount of electromotive force produced by said dynamo.

28. In combination with a source of electrical energy, a circuit supplied therefrom, and means responsive to variation from desired working conditions for introducing an electromotive force either opposed to or acting with the electromotive force supplied directly from the main source.

29. The combination of a source of electromotive force, a motor whose speed is to be automatically accelerated under certain conditions, a relay which under normal working conditions is in the open circuit condition and which under abnormal conditions makes contact automatically at one or the other of two contacts, electro-responsive means energized respectively when one or the other of said contacts is made, and means controlled by said electro-responsive means for varying the electromotive force of said source to restore normal working conditions.

30. The combination of a source of electromotive force, a second source of electromotive force in series therewith, a translating device, a relay which under normal working conditions is in the open circuit condition and which under abnormal conditions makes contact automatically at one or the other of two contacts, electro-responsive means energized respectively when one or the other of said contacts is made, and means controlled by said electro-responsive means for varying the electromotive force of one of said sources to restore normal working conditions.

31. The combination of a source of electromotive force, a motor whose speed is to be varied, a device for varying the electromotive force derived from said source, and electro-responsive means responsive to abnormal working conditions which automatically varies the electromotive force derived from said source to automatically control the electrical conditions on the circuit of said motor.

32. The combination of a source of electromotive force, a translating device, an electromotive force producing device for regulating the electromotive force, and electro-responsive means responsive to abnormal working conditions for automatically controlling both the direction and the amount of the electromotive force supplied by said device to control the electrical conditions on the circuit of said translating device.

33. The combination of a source of electric energy, and a relay device responsive to abnormal working conditions for varying and reversing the electromotive force of said source of energy and thereby restoring normal working conditions.

34. The combination of a dynamo electric machine having a separately excited field winding, and a relay device responsive to abnormal working conditions for varying the strength of field produced by said winding and thereby restoring normal working conditions.

35. The combination of a dynamo electric machine having a separately excited field winding, a rheostat in circuit with said winding, and a relay device responsive to abnormal working conditions for effecting the movement of said rheostat and thereby restoring normal working conditions.

36. The combination of a dynamo electric machine, a reversing rheostat in circuit with a field winding thereof, and a reversible pilot motor for operating said rheostat and thereby varying and reversing the current in said field winding.

37. The combination of a source of electromotive force, a dynamo electric machine having a shunt field winding and connected to said source, a second dynamo electric machine mechanically connected to said first machine and having a field winding energized by a current different from its armature current, and means for automatically varying the current in said latter field winding for controlling the energy output of the armature of said second machine.

38. The combination of an electric motor having a field winding energized by a current other than the current passing through the armature circuit, a dynamo electric machine having its armature connected in series with the armature of said motor, and means dependent upon the work to be performed for automatically varying the electromotive force of said dynamo electric machine.

39. The combination of an electric motor having a field winding energized by a current other than the current passing through the armature circuit, an electromotive force producing winding in series with one element of said motor, and means dependent upon the work performed for automatically varying the electromotive force of said winding.

40. The combination of a translating device requiring a variation of electromotive force upon its terminals to suit the conditions of practice, a constant electromotive force source supplying energy thereto, an electromotive force producing device in series with said translating device, and means for automatically varying the electromotive force of said device to vary the electromotive force upon the translating device as required.

41. The combination of a source of electric energy, an energy absorbing electromotive force producing winding receiving energy therefrom, an electromotive force producing device in series with said winding, and means dependent upon a variation of conditions of practice for automatically varying the electromotive force in series with said winding whereby the energy absorbed by said winding will be automatically varied as required.

42. The combination of an electric motor having a field winding independent of the electromotive force or current of its armature, a dynamo electric machine in series with said motor, and means for automatically varying the electromotive force upon the terminals of said motor armature by automatically varying the magnetic field of said machine.

43. The combination of an electric motor having a field winding energized by a current other than the current passing through the armature circuit, a dynamo electric machine in series with said motor, and means for automatically varying the electromotive force upon the terminals of said motor armature by automatically varying the magentic field of said machine.

44. The combination of a translating device, an electromotive force producing device in series therewith, means for automatically increasing and decreasing the electromotive force upon said translating device by producing a reversal of electromotive force relative to said translating device.

45. The combination of a source of electric energy, two sources of electromotive force electrically connected therewith, and means for automatically varying the electromotive force of one of said two sources to automatically vary the electromotive force applied to the other of the said two sources of electromotive force.

46. The combination of a dynamo electric machine having a separately excited field winding, an electric motor electrically connected with said machine, and means for automatically varying the current in said field winding for varying the speed of the motor.

47. The combination of a source of electrical energy, an electromotive force producing device supplied with energy derived therefrom, and an automatic controlling device for said first named device for governing both the direction and the amount of electromotive force produced by said first named device.

48. The combination of a source of constant electromotive force, a variable and reversible source of electromotive force, an electric motor in circuit therewith, and automatic means for varying and reversing the electromotive force of said second source for varying the speed of the motor.

49. The combination of a dynamo electric machine, an electric motor in circuit with said machine, a reversible rheostat in series with one element of said machine, and means for automatically reversing said rheostat for controlling said motor.

50. The combination of a dynamo electric machine having a field winding energized by a current which is independent of a change in the current passing through its armature, a reversible rheostat in series with one element of said machine, and means for automatically reversing said rheostat.

51. The combination of a dynamo electric machine having a field winding energized by a current which is independent of a change in the current passing through its armature, a reversible rheostat in series with said field winding, and means for automatically controlling said rheostat.

52. The combination of a source of electrical energy, a dynamo electric machine actuated by energy derived therefrom, and an automatic controlling device for said machine governing both the direction and the amount of electromotive force produced by said machine.

53. The combination of a source of electric energy, an electromotive force producing winding energized by energy from said source, and an automatic controlling device for said winding governing both the direction and amount of the electromotive force produced by said winding.

54. The combination of a dynamo electric machine, a reversing rheostat in series with one element of said machine, and a pilot motor for operating said rheostat and thereby controlling the current in said machine element.

55. The combination of a dynamo electric machine, a reversing rheostat in series with one element of said machine, and a reversible electrically controlled device for operating said rheostat and thereby controlling the current in said element.

56. The combination of a source of electromotive force, a dynamo electric machine having a field winding energized by a current other than that passing through the armature circuit, said machine being connected to said source, a second dynamo electric machine mechanically connected to said first machine and having a field winding energized by current different from its armature current, and means responsive independently of the current supplied to said first named machine for controlling the energy output of the armature of said second machine.

57. The combination of a pump, an electric motor for driving the same, said motor having a field winding energized by a current other than that passing through the armature circuit, a device responsive to the condition of the fluid pumped for automatically controlling the speed of the motor so as to maintain the speed of the motor approximately proportionate to the rate at which the fluid flows away in practice.

58. The combination of a pump, an electric motor for driving the same, said motor having a field winding energized by a current other than that passing through the armature circuit, a device responsive to the condition of the fluid pumped for automatically controlling the speed of the motor while maintaining the resistance in the motor armature circuit practically constant.

59. The combination of a source of constant electromotive force, a device comprising a counter electromotive force producing winding adapted to supply a variable electromotive force, an electric motor, the said source, winding and armature of said motor being connected in series, and means dependent upon the work to be performed for automatically varying the electromotive force supplied to the motor armature.

60. The combination of a source of electric energy, an energy absorbing electromotive force producing winding receiving energy therefrom, a device comprising a counter-electromotive force producing winding in series with said first named winding, and means dependent upon a variation of conditions of practice for automatically varying the counter-electromotive force in series with said first named winding whereby the energy absorbed by said first named winding will be automatically varied as required.

This specification signed and witnessed this 11th day of January 1902.

H. WARD LEONARD.

Witnesses:
J. L. KEBLER,
HARRY F. DAVIDSON.